US008019670B2

(12) United States Patent
Madhavan et al.

(10) Patent No.: US 8,019,670 B2
(45) Date of Patent: Sep. 13, 2011

(54) FACTOR RISK MODEL BASED SYSTEM, METHOD, AND COMPUTER PROGRAM PRODUCT FOR GENERATING RISK FORECASTS

(75) Inventors: Ananth Madhavan, New York, NY (US); Artem V. Asriev, Winchester, MA (US); Scott J. Kartinen, New York, NY (US); Jian Yang, Sharon, MA (US); Vitaly Serbin, Boston, MA (US); Ian Domowitz, New York, NY (US); Kenneth E. Gosier, Cambridge, MA (US)

(73) Assignee: ITG Software Solutions, Inc., Culver City, CA (US)

( * ) Notice: Subject to any disclaimer, the term of this patent is extended or adjusted under 35 U.S.C. 154(b) by 0 days.

(21) Appl. No.: 12/830,017

(22) Filed: Jul. 2, 2010

(65) Prior Publication Data
US 2011/0004567 A1 Jan. 6, 2011

Related U.S. Application Data

(62) Division of application No. 10/406,282, filed on Apr. 4, 2003, now Pat. No. 7,752,099.

(60) Provisional application No. 60/418,727, filed on Oct. 17, 2002.

(51) Int. Cl.
*G06Q 40/00* (2006.01)

(52) U.S. Cl. .......................................... 705/35; 705/28
(58) Field of Classification Search ............ 705/35, 705/28
See application file for complete search history.

(56) References Cited

U.S. PATENT DOCUMENTS

| | | | | |
|---|---|---|---|---|
| 2002/0147671 A1* | 10/2002 | Sloan et al. | ................ | 705/36 |
| 2003/0110016 A1* | 6/2003 | Stefek et al. | ................ | 703/2 |
| 2008/0313100 A1* | 12/2008 | Weber et al. | ................ | 705/36 R |

OTHER PUBLICATIONS

Alexander, Carol; How to Generate Large Covariance Matrices. Nov. 26, 2001. Derivatives Week v10,n47, p. 8(2).*
Sakakibara et al., "Theory of Security Investment (3rd ed.)", Nikkei Inc., Apr. 24, 1998, pp. 125-136, 209-216 (28 pages) (Partial Translation (4 pages)).
Aguilar et al., "Bayesian Dynamic Factor Models and Variance Matrix Discounting for Portfolio Allocation", the Internet, Jan. 1998 (30 pages).
Part of "Examination Guidelines for Inventions in Specific Fields", pp. 1, 3-7, 11-13, 16-18, 33-35, 43-46 (19 pages).
Amihud, Y et al. "Asset Pricing and the Bid-Ask Spread," Journal of Financial Economics 17, 223-249, 1986.
Amihud, Y. et al., "The Effects of Beta, Bid-Ask Spread, Residual Risk, and Size on Stock Returns," Journal of Finance, 44(2), Jun. 1989, 479-86.

(Continued)

*Primary Examiner* — Ella Colbert
*Assistant Examiner* — John A Anderson
(74) *Attorney, Agent, or Firm* — Rothwell, Figg, Ernst & Manbeck, PC

(57) ABSTRACT

A computerized method for generating risk forecasts is provided. A set of securities is selected. A set of risk factors is selected. The risk factor returns a determined. A risk factor covariance matrix and an idiosyncratic variance matrix are constructed. For each risk factor, a factor loading coefficient is determined for each selected security. The risk factor covariance matrix is projected into a future forecast. The idiosyncratic variance matrix is projected into a future forecast. The factor loading coefficients, the future forecast of the risk factor covariance matrix, and the future forecast of the idiosyncratic variance matrix can be used to determine a forecast of the variance-covariance matrix for the selected securities.

33 Claims, 3 Drawing Sheets

OTHER PUBLICATIONS

Amihud, Y. et al., "Liquidity, Maturity and the Yields on U.S. Government Securities," Journal of Finance 46(4), 1411-1425, Sep. 1991.

Amihud, Y. et al., "Market Microstructure and Securities Values: Evidence from the Tel Aviv Stock Exchange," Journal of Financial Economics 45, 365-390, 1997.

Binder, J., "The Event Study Methodology Since 1969," Review of Quantitative Finance and Accounting, 11, 111-137, 1998.

Blume, M., "Betas and their Regression Tendencies," Journal of Finance, 30(3), 785-795, Jun. 1975.

Bollerslev T., "Generalized Autoregressive Conditional Heteroskedasticity," Journal of Econometrics, 31, 307-327, 1986.

Bollerslev T. et al., "Price Volatility, Spread Variability, and the Role of Alternative Market Mechanisms," Review of Futures Market, 10(1), 79-102, 1991.

Bollerslev T. et al., A Capital Asset Pricing Model with Time-Varying Covariances, Journal of Political Economy 96 (1), 116-131, 1988.

Brennan, M. J. et al., "Market Microstructure and Asset Pricing: On the Compensation for Liquidity in Stock Returns," Journal of Financial Economics 41, 441-464, 1996.

Brennan, M.J. et al., "Alternative Factor Specifications, Security Characteristics, and the Cross-Section of Expected Stock Returns," Journal of Financial Economics 49, 345-373. 1998.

Campbell, J., Y. et al., "The Econometrics of Financial Markets Table of Contents," Princeton University Press, Princeton, NJ, 1997.

Chan, L., K.C. et al., "On Portfolio Optimization: Forecasting Covariances and Choosing the Risk Model,"Review of Financial Studies 12(5), 937-974. 1999.

Chou, R., "Volatility Persistence and Stock Valuation: Some Empirical Evidence Using GARCH," Journal of Applied Econometrics 3, 279-294. 1988.

Coppejans, M. et al., "Liquidity in an Automated Auction," Working Paper, Pennsylvania State University, 1-42, 2001.

Connor, G. et al., "Performance Measurement with the Arbitrage Pricing Theory," Journal of Financial Economics 15, 373-394, 1986.

Daniel K. et al., "Evidence on the Characteristics of Cross Sectional Variation in Stock Returns," Journal of Finance 52(1), 1-33, 1997.

Engle, R., "Autoregressive Conditional Heteroscedasticity with Estimates of the Variance of United Kingdom Inflation," Econometrica 50(4), 987-1007, 1982.

Engle, R. et al., "Asset Pricing with a Factor ARCH Covariance Structure: Empirical Estimates for Treasury Bills," Journal of Econometrics 45, 213-237, 1990.

Fama, E. et. al., "The Adjustment of Stock Prices to New Information," International Economic Review, 10(1), 1-21, Feb. 1969.

Fama, E. et al., "The Cross Section of Variation in Expected Stock Returns," Journal of Finance, 67(2), Jun. 1992.

Fama, E et al., "Common Risk Factors in the Returns on Stock and Bonds," Journal of Financial Economics, 33, 3-56, 1993.

French, K. et al., "Expected Stock Returns and Volatility," Journal of Financial Economics 19, 3-29, 1987.

Jiang, L. et al., "Trading Activity, Quoted Liquidity, and Stock Volatility," Multinational Finance Journal, 3(3). 199-227, 1998.

Jones, C., "Extracting Factors from Heteroskedastic Asset Returns," Journal of Financial Economics 62, 293-325, 2001.

Keim, D. et al., "The Cost of Institutional Equity Trades," Financial Analysts Journal 54: 50-69, Jul./Aug. 1998.

Klemkosky et al., "The Adjustment of Beta Forecasts," Journal of Finance, 30(4), 1123-1128, Sep. 1975.

Kluger, B. et al., "Alternative Liquidity Measurers and Stock Returns," Review of Quantitative Finance and Accounting, 8, 19-36, 1997.

Lakonishok, J. et al., "Contrarian Investment, Extrapolation and Risk," Journal of Finance 71(5), 1541-1578, Dec. 1994.

Lee, C. et a., "Price Momentum and Trading Volume," Journal of Finance, 55(5), 2017-2069, Oct. 2000.

Levy, R., "On the Short-Term Stationarity of Beta Coefficients," Financial Analysts Journal, 55-62, Nov.-Dec. 1971.

Li, H. et al., "Modeling Stock Volatility with Trading Information," Technical Report, Department of Economics, The University of Western Ontario, 1-35, 2000.

Lin, S. et al., "Examining Intraday Returns with Buy/Sell Information," Applied Financial Economics, 13, 447-461, 2003.

Lo, A. et al., "Trading Volume: Definitions, Data Analysis and Implications of Portfolio Theory," The Review of Financial Studies, 13(2), 257-300. Summer 2000.

Mackinlay, C., "Event Studies in Economics and Finance," Journal of Economic Literature, 35, 13-39, Mar. 1997.

Madhavan, A., et al., "Why do Security Prices Change? A Transaction-Level Analysis of NYSE Stocks," The Review of Financial Studies, 10(4), 1035-1064, Winter 1997.

Madhavan, A. et al., "A Bayesian Model of Intraday Specialist Pricing," Journal of Financial Economics, 30, 99-134, 1991.

Vasicek, O., "A Note on Using Cross-Sectional Information in Bayesian Estimation of Security Betas," Journal of Finance, 1233-1239. Aug. 1971.

\* cited by examiner

FACTOR RISK MODEL BASED SYSTEM, METHOD, AND COMPUTER PROGRAM PRODUCT FOR GENERATING RISK FORECASTS

This application is a divisional of U.S. application Ser. No. 10/406,282, now U.S. Pat. No. 7,752,099, entitled, "A Factor Risk Model Based System, Method and Computer Program Product for Generating Risk Forecasts," and filed on Apr. 4, 2003, which claimed the benefit under 35 U.S.C. §119(e) of U.S. Provisional Patent Application No. 60/418,727, filed on Oct. 17, 2002, the contents of each of which are incorporated herein by reference.

BACKGROUND OF THE INVENTION

1. Field of the Invention

This invention relates generally to the field of investment risk management and, more specifically, to a system, method, and computer program product for generating risk forecasts by predicting future volatility of single stocks and portfolios of stocks.

2. Discussion of the Background

Accurate and meaningful risk analysis is essential to superior investment performance. A standard definition of risk is the dispersion or volatility of returns for a single asset or a portfolio of assets, usually measured by standard deviation.

Standard portfolio theory, and modern analogues embodied in a range of value-at-risk (VaR) models, require estimates of volatility and covariance between stock returns in order to generate a risk forecast. It is well known that using the naive sample covariance matrix leads to unreliable risk forecasts simply because too many parameters have to be estimated from too little data. As an example, for a portfolio of 200 stocks, 20,100 parameters should be estimated in order to obtain the necessary covariance matrix. This is a manifestation of the so-called curse of dimensionality. Further, the out-of-sample forecasting performance of this naive estimate is hampered due to giving too much weight to the idiosyncratic component of risk.

The most common way to deal with this problem is to impose some structure on stock returns. In other words, it is assumed that stock returns are driven by several common factors. Consequently, volatility of stock returns can largely be explained by the volatility of factor returns. The so-constructed risk model is called a factor risk model, which provides a simple framework to reduce the curse of dimensionality and to identify sources of risk. In addition, a factor risk model makes it tractable to filter outliers and obtain more robust risk estimates. Additionally, a factor risk model makes it workable to achieve more accurate, forward-looking, risk forecasts.

A proper factor risk model has to address the following issues. First, it must be feasible to estimate. Second, it has to be intuitive to use. Third, it has to be parsimonious enough to avoid over-fitting and guarantee adequate out-of-sample performance. Finally, it must reflect commonalties in stock returns in order to reduce noise and to achieve the decompositions desired in making investment decisions such as hedging, bench marking, performance attribution, and segmented analysis.

SUMMARY OF THE INVENTION

The present invention provides a factor risk model based system, method, and computer program product for generating risk forecasts by predicting future volatility of single stocks and portfolios of stocks.

According to one embodiment of the invention, the method includes: selecting a set of securities; selecting at least two risk factors associated with investment risk in the securities; determining, for each selected risk factor, the risk factor's return; constructing a risk factor covariance matrix corresponding to the selected risk factors; constructing an idiosyncratic variance matrix corresponding to the securities in the selected set of securities; determining, for each selected risk factor, a risk factor loading coefficient for each security in the set; projecting the risk factor covariance matrix into a future forecast, thereby producing a future forecast of the risk factor covariance matrix; and projecting the idiosyncratic variance matrix into a future forecast, thereby producing a future forecast of the idiosyncratic variance matrix, wherein the determined risk factor loading coefficients, the future forecast of the risk factor covariance matrix, and the future forecast of the idiosyncratic variance matrix can be used together to determine a forecast of the variance-covariance matrix for all securities in the selected set of securities.

In some preferred embodiments, the step of determining a particular risk factor loading coefficient for a stock includes performing a time series regression to obtain the sensitivity of the stock's return to variations in the risk factor's return. Use of this feature can (a) result in better risk factor exposure estimates, (b) allow inclusion of a "market" factor, which can be a major risk factor in terms of explanatory power, (c) reduce the number of factors needed to explain stock price movements, and (d) create demonstrably better risk hedges.

Additionally, in some preferred embodiments, implied volatility in the Chicago Board Options Exchange VIX option is used to adjust the risk models to capture market expectations of future volatility.

The above and other features and advantages of the present invention, as well as the structure and operation of preferred embodiments of the present invention, are described in detail below with reference to the accompanying drawings.

BRIEF DESCRIPTION OF THE DRAWINGS

The accompanying drawings, which are incorporated herein and form part of the specification, illustrate various embodiments of the present invention and, together with the description, further serve to explain the principles of the invention and to enable a person skilled in the pertinent art to make and use the invention. In the drawings, like reference numbers indicate identical or functionally similar elements. Additionally, the left-most digit(s) of a reference number identifies the drawing in which the reference number first appears.

DETAILED DESCRIPTION OF THE PREFERRED EMBODIMENTS

While the present invention may be embodied in many different forms, there is described herein in detail an illustrative embodiment(s) with the understanding that the present disclosure is to be considered as an example of the principles of the invention and is not intended to limit the invention to the illustrated embodiment(s).

According to the invention, future volatility of a single security (such as a stock) or a portfolio of securities is predicted by adopting a factor risk model wherein the total return of a security over a period of time is represented as the sum of returns attributable to various selected risk factors representative of systemic risk of the market to which the security belongs (such as U.S. stocks), plus a return representative of a security-specific risk specific to that security. The "exposure" or degree of influence that each selected systemic risk factor has on a security is represented by a factor loading coefficient β. Factor loading coefficients for each selected risk factor for each selected security are obtained by fitting the factor risk model equation to historical return data over a preselected period of time. In a preferred embodiment, factor loading coefficients are obtained for an entire universe of active securities (such as, for example, all actively traded U.S. stocks). In addition, a factor covariance matrix future forecast and an idiosyncratic variance matrix future forecast are obtained and assembled in a data file(s) along with the obtained factor loading coefficients. Users, such as portfolio investment managers, are able to use the data file(s) to calculate a forecast of the variance-covariance matrix for all stocks in the universe or a subset of the stocks in the universe corresponding to the stocks included in the portfolio investment managers' portfolio.

Figure 1:
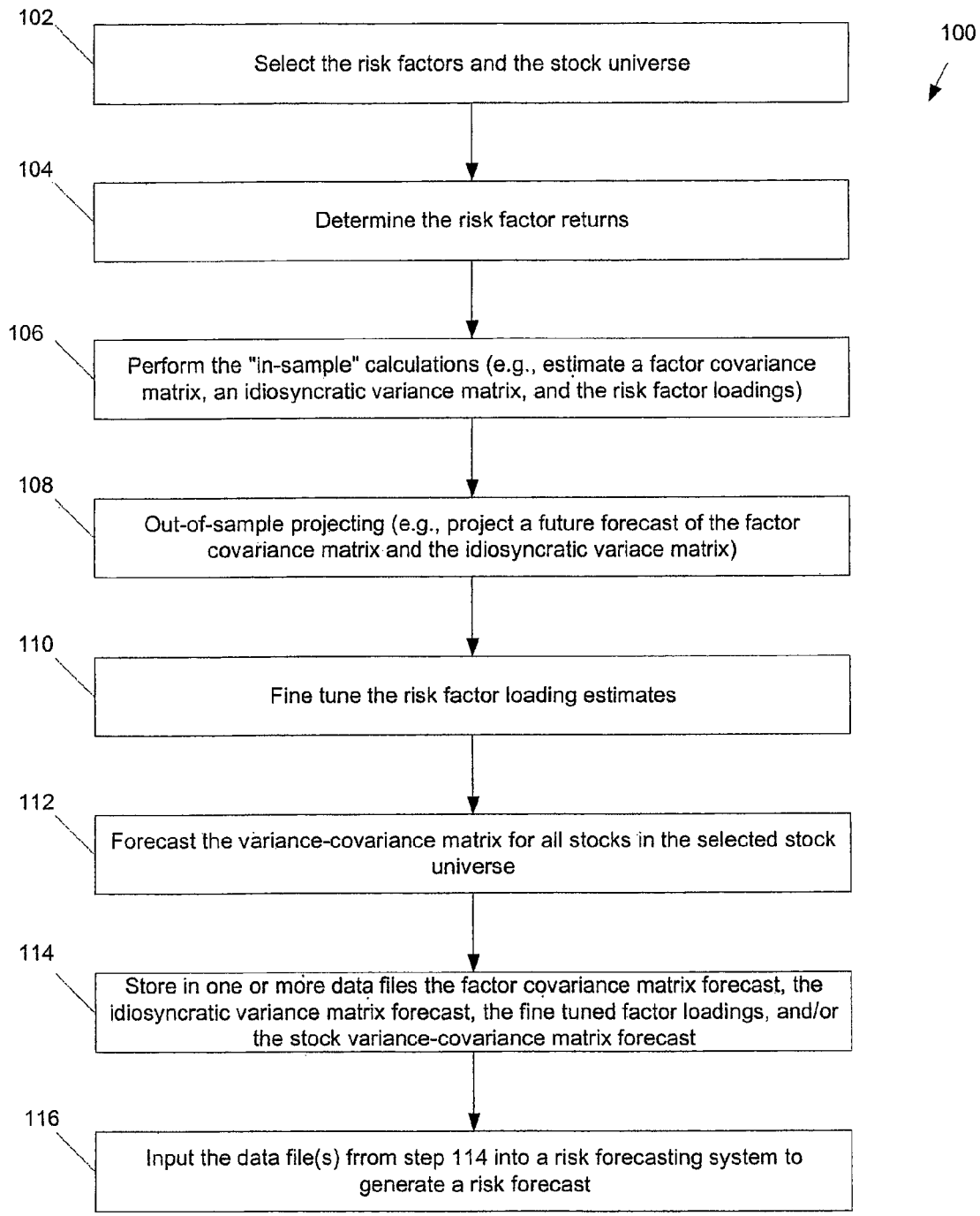
FIG. 1 is a flow chart illustrating a process according to an embodiment of the invention.

FIG. 1 is a flow chart illustrating a process 100, according to an embodiment of the invention, for generating a risk forecast. Process 100 begins at step 102. In step 102, two or more risk factors and a stock universe are selected.

Preferably, the universe of selected stocks includes all of the relatively active securities in the relevant market (but this is not required). Assuming, for example, that the U.S. market is the relevant market, then the universe of stocks may consist of approximately 8,000 stocks, including stocks from the New York Stock Exchange, the American Stock Exchange, the NASDAQ National Market, and some small cap stocks (i.e., "over the counter").

Risk factor candidates, according to some preferred embodiments, are identified from different sources under alternative rationales. In selecting risk factors, one should aim to capture risk at different levels and different directions.

The selected risk factors should be intuitive and interpretable in order to simplify the portfolio evaluation management process. Additionally, selected factors should make a significant contribution to the model's in-sample performance. However, in-sample performances of the factors collectively (total $R^2$) do not reflect the model's performance in actual applications. This is because the main purpose of any risk model is to provide accurate volatility forecasts. Therefore, only factors that have a persistent effect on the volatility can be useful in predicting the future volatility of the portfolio. Parsimony is a very important issue if one worries about out-of-sample performance of the model. The more factors included in the model, the better is the model's in-sample fit, but the more things can go wrong from out-of-sample perspective. Throwing too many factors into the "kitchen sink" simply brings noise, rather than information.

Figure 2:
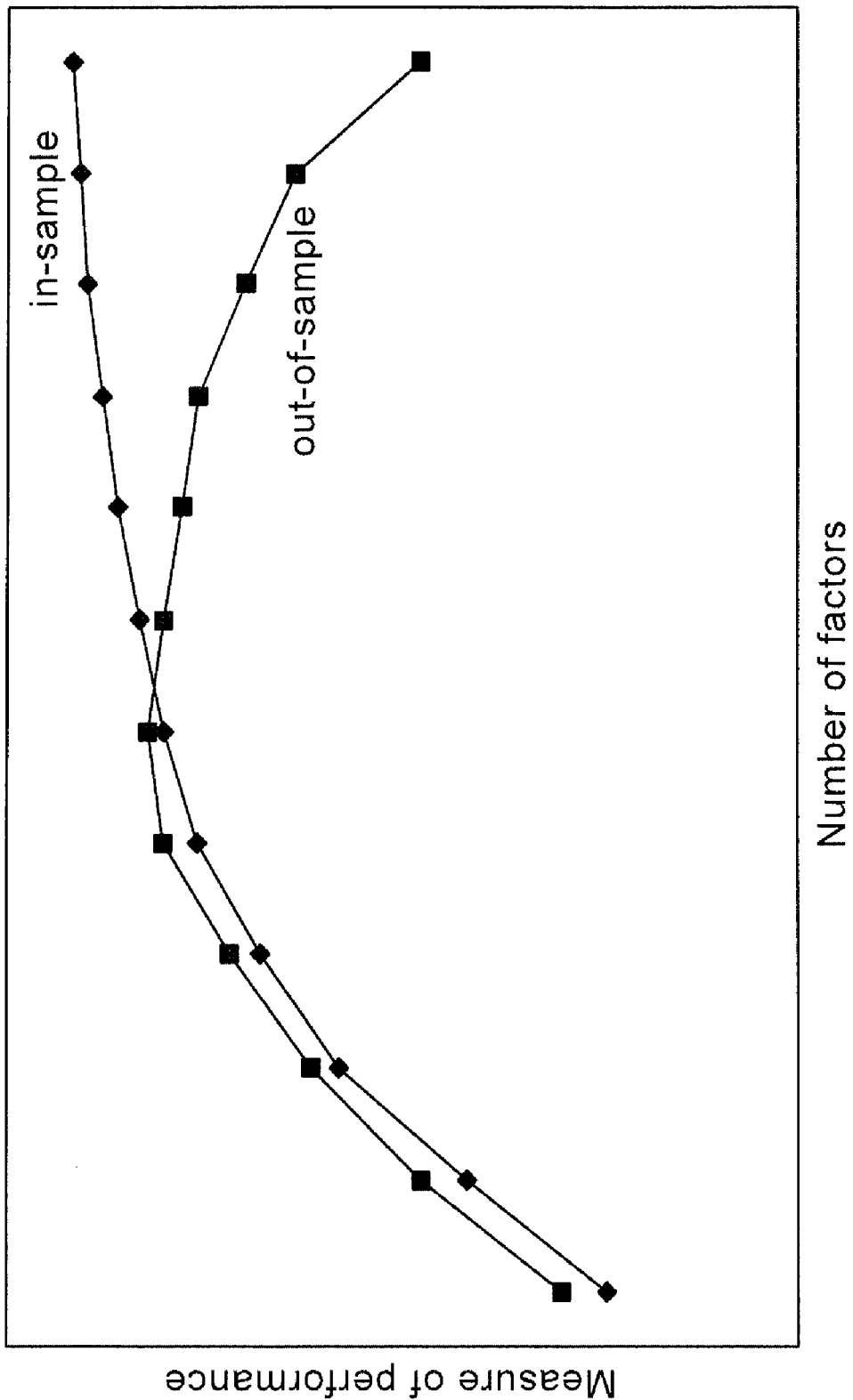
FIG. 2 depicts a typical balance between in-sample and out-of-sample simulation results.

FIG. 2 depicts a typical balance between in-sample and out-of-sample simulation results. The horizontal axis indicates the number of factors and the vertical axis indicates the in-sample and out-of-sample performances (normalized for demonstration purposes). The in-sample curve is increasing, but concave to the original point, which reveals "the law of diminishing returns" in terms of in-sample fitting. Economic variables are generally overlapped such that additional information contributed by an extra variable to a benchmark with a few most important variables becomes very marginal. After a certain point, additional variables will simply bring in more noise rather than information and the out-of-sample performance will start declining. This suggests the common modeling rule, parsimony.

When applying statistical in-sample inference to select risk factors, one may wish to keep in mind that only out-of-sample performance really matters in the end. A risk model is an investment tool used by portfolio managers, who make investment decisions based on estimates of future returns and volatilities.

In a preferred embodiment of the invention, different risk factors should be chosen depending on the securities that are being analyzed. For example, a set of factors that adequately represents the systematic risk of U.S. stocks may not adequately represent other stocks, such as Canadian or U.K. stocks. Thus, one may select a different set of factors when analyzing Canadian stocks than when analyzing U.S. stocks.

In one embodiment of the invention, for the U.S. market, the following factors were chosen: market, sector, industry, size and growth. These factors are able to capture different degrees of co-variation between and within different groups of stocks. For instance, volatilities of stocks in the same industry are driven not only by volatility of the market factor, but also by volatility of the industry-specific factor. The present invention, however, is not limited to this or any other specific set of factors. These factors are listed merely to serve as an example.

The market factor is defined as a return of the weighted portfolio of the largest stocks. The sector factor is defined as the weighted average returns of top stocks in a given sector. Similarly, the industry factor is the weighted average return of all stocks in a given industry, where "industry" refers to a sub-grouping of the sectors. Variations in sector returns are partially driven by volatility of the market as a whole, which has already been taken into account by the market factor. In order to obtain more meaningful and robust loadings, sector factors are therefore orthogonalized to the size, growth, and market factors; size and growth factors are orthogonalized to the market factor; and industry factors are orthogonalized to the sector factor to which the industry belongs and to size, growth, and market factors. The proxies for the size and growth factors are traditionally measured as the returns on an investment strategy that goes long in stocks that have high values of the corresponding attribute (in this case—size or growth) and short in stocks that have low values of the corresponding attribute. The size and the growth factors explain a significant amount of stock volatility and covariances.

Referring back to FIG. 1, in step 104, the factor returns ($f_{kt}$) are computed using market and accounting data, where $f_{kt}$ is the return of factor k at time t. Market data includes such data as stock prices and can be obtained from many sources. Accounting data includes such data as book and market values, which can also be obtained from a number of sources.

In step 106, the "in-sample" calculations are performed. That is, for example, a variance-covariance matrix of the risk factor returns ($\phi_t$) (also referred to as the risk factor covariance matrix ($\phi_t$)) is constructed, an idiosyncratic variance matrix ($\Sigma_t$) is constructed, and the factor loadings ($\beta_k$) for each stock in the selected universe are estimated, where $$\Phi_t = \begin{bmatrix} \varphi_{1,t}^2 & \varphi_{21,t} & \cdots & \varphi_{K1,t} \\ \varphi_{12,t} & \varphi_{2,t}^2 & \cdots & \varphi_{K2,t} \\ \vdots & \vdots & & \vdots \\ \varphi_{1K,t} & \varphi_{2K,t} & \cdots & \varphi_{K,t}^2 \end{bmatrix}, \text{ and } \Sigma_t = \begin{bmatrix} \sigma_{1,t}^2 & 0 & \cdots & 0 \\ 0 & \sigma_{2,t}^2 & \cdots & 0 \\ \vdots & \vdots & & \vdots \\ 0 & 0 & \cdots & \sigma_{N,t}^2 \end{bmatrix},$$

and where $\phi_{ij,t}$ is the covariance between factors i and j at time t, $\phi^2_{i,t}$ is the variance of factor i at time t, and $\sigma^2_{i,t}$ is the variance of a disturbance term $\epsilon_{it}$ associated with stock i at time t.

Preferably, time series regressions are implemented to obtain the factor loadings ($\beta_{ik}$), or sensitivities, of stock returns to the variations in factor returns. In a preferred embodiment, factor loadings for each stock are obtained by estimating the equation shown below over the last 60 periods:

$$r_{it} = \alpha_i + \sum_{k=1}^{K} f_{kt}\beta_{ik} + \varepsilon_{it},$$

where $r_{it}$ is the return of stock i at time t, t=1, ..., T and i= 1, ..., N (T is the number of observations in the estimation window, and N is the size of the stock universe). Risk factor returns are given by $f_{kt}$, k=1, ..., K. Parameters of the model include $\alpha_i$, the intercept of stock i and $\beta_{ik}$, the factor loading, or factor exposure to factor k of stock i. $\epsilon_{it}$ is the disturbance term of stock i at time t and has a mean of zero, and variance $\sigma^2_{it}$. The loadings ($\beta_{ik}$) are computed from historical data and are expected to truly represent the underlying economic relationship between stocks' returns and factor returns. Implementing such time series regressions results in better risk factor loading estimates, allows inclusion of a "market" factor, a major risk factor in terms of explanatory power, reduces the number of factors needed to explain stock price movements, and creates demonstrably better risk hedges. Other advantages may also exist.

When choosing the estimation window size T, there is a trade-off between estimation precision and the speed with which the information is updated. Larger sample sizes are especially useful when there are no significant changes in the market environment. This is a rather poor assumption for certain periods, and the models estimated with very large T do not put adequate weight on newly arrived information. Based on these considerations, and on the results of a stability analysis, 60 past time periods are preferably used as the estimation window (for example, a daily model may use the 60 most recent trading days and a monthly model may use the 60 most recent months). The estimation window of 60 samples is for the calculation of individual stock loadings and the raw factor covariance matrix. However, it is not sufficient for obtaining robust generalized autoregressive conditional heteroskedasticity (GARCH) parameters and an estimation window of 120 samples has been used for GARCH estimation.

For stocks with an insufficient number of observations it is preferable to use the average loadings across stocks in the same industry. For stocks with a reasonable number of observations but not full samples, it is preferable to apply the weighted average of estimated factor loadings and the industry average loadings. And the weight on estimated factor loadings depends positively on the number of observations.

Referring back to FIG. 1, step 108 is referred to as the "out-of-sample" projecting step. In this step, the factor covariance matrix ($\phi_t$) and the idiosyncratic variance matrix ($\Sigma_t$) are projected into future forecasts $\phi_{t+1}$ and $\Sigma_{t+1}$, respectively, by using a GARCH specification to capture the time-varying feature of stock volatility and further by utilizing information in implied volatility to give the estimates a forward-looking property. In one embodiment, implied volatility in the Chicago Board of Options Exchange (OBOE) VIX option contract is used in the out-of-sample projecting step. This feature captures the market's expectations of future volatility.

Step 110 is referred to as the fine tuning step because it produces fine tuned factor loadings. More specifically, in one embodiment, the factor loading estimates are fine-tuned using Bayesian adjusting, which filters out noise numerically generated during the in-sample estimation process.

In step 112, the forecast of the variance-covariance matrix for all stocks in the universe ($V_{t+1}$) can be calculated according to the formula: $V_{t+1} = B \phi_{t+1} B' + \Sigma_{t+1}$, where $$B = \begin{bmatrix} \beta_{11} & \beta_{12} & \cdots & \beta_{1K} \\ \beta_{21} & \beta_{22} & \cdots & \beta_{2K} \\ \vdots & \vdots & & \vdots \\ \beta_{N1} & \beta_{N2} & \cdots & \beta_{NK} \end{bmatrix}, \text{ and } V_t = \begin{bmatrix} v_{1,t}^2 & v_{21,t} & \cdots & v_{N1,t} \\ v_{12,t} & v_{2,t}^2 & \cdots & v_{N2,t} \\ \vdots & \vdots & & \vdots \\ v_{1N,t} & v_{2N,t} & \cdots & v_{N,t}^2 \end{bmatrix},$$

and where $v_{ij,t}$ is the covariance between stocks i and j at time t, and $v^2_{i,t}$ is the variance of stock i at time t.

In step 114, data, such as the future forecast of the factor covariance matrix ($\phi_{t+1}$), the future forecast of the idiosyncratic variance matrix ($\Sigma_{t+1}$), the fine tuned factor loadings (B), and/or the future forecast of the stock variance-covariance matrix ($V_{t+1}$), may be stored in one or more computer readable electronic files. Once the data is stored in the one or more file(s), the file(s) can be downloaded and/or imported into other systems designed to analyze the risk of a particular stock or portfolio of stocks as is well known in the art. And in step 116, the data file(s) can be used by risk forecasting systems to generate a risk forecast for a stock or a portfolio of stocks. Such risk forecasting systems are well known to those skilled in the relevant art.

Figure 3:
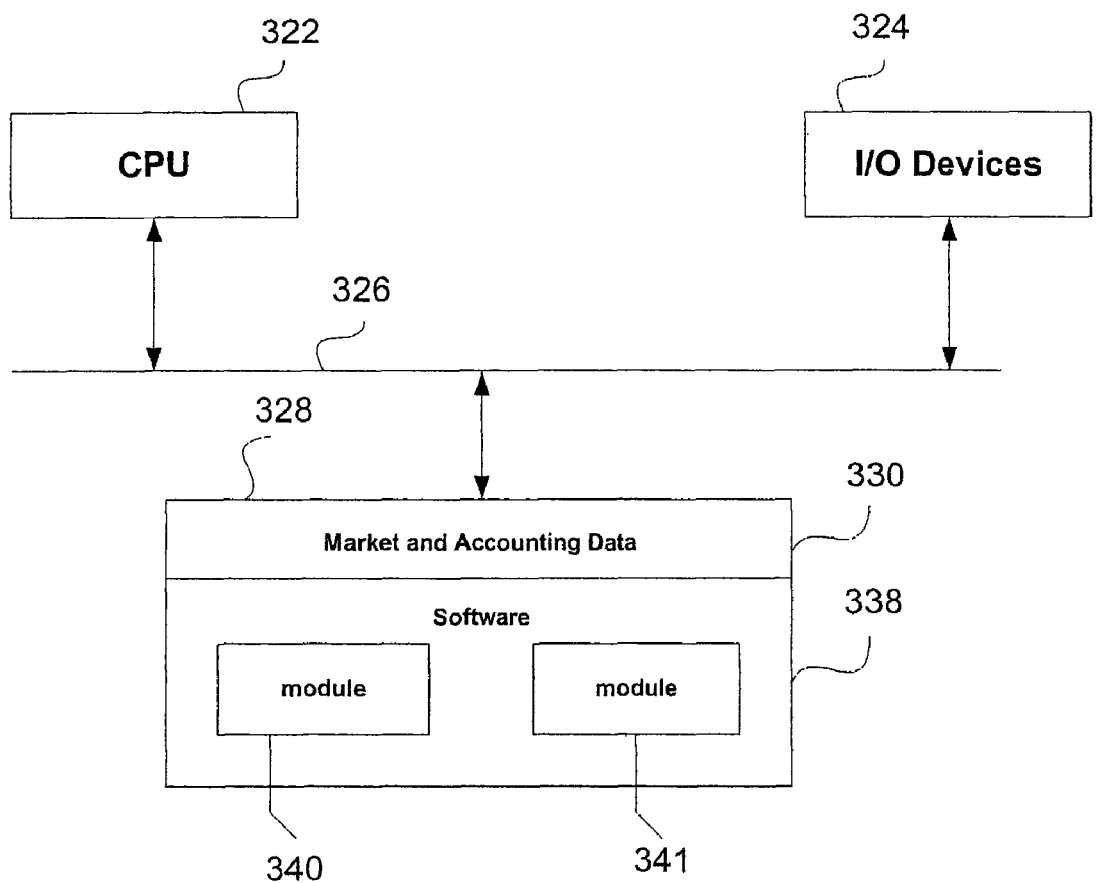
FIG. 3 illustrates a general purpose computer that can be used to, among other things, implement the process illustrated in FIG. 1.

FIG. 3 illustrates a general purpose computer 320 that can be used to implement process 100. The computer 320 includes a central processing unit (CPU) 322, which communicates with a set of input/output (I/O) devices 324 over a bus 326. The I/O devices 324 may include a keyboard, mouse, video monitor, printer, etc.

The CPU 322 also communicates with a computer readable medium (e.g., conventional volatile or non-volatile data storage devices) 328 (hereafter "memory 328") over the bus 326. The interaction between a CPU 322, I/O devices 324, a bus 326, and a memory 328 are well known in the art.

Memory 328 can include market and accounting data 330, which includes data on stocks, such as stock prices, and data on corporations, such as book value.

The memory 328 also stores software 338. The software 338 may include a number of modules 340 for implementing the steps of process 100. Conventional programming techniques may be used to implement these modules. Memory 328 can also store the data file(s) discussed above.

While the invention has been described in detail above, the invention is not intended to be limited to the specific embodiments as described. It is evident that those skilled in the art may now make numerous uses and modifications of and departures from the specific embodiments described herein without departing from the inventive concepts.

What is claimed is:

1. A method for generating risk forecasts in financial securities, comprising the steps of:
   selecting a set of securities;
   selecting at least two risk factors associated with investment risk in the securities;
   determining, for each selected risk factor, the risk factor's return;
   constructing a risk factor covariance matrix corresponding to the selected risk factors;
   constructing an idiosyncratic variance matrix corresponding to the securities in the selected set of securities;
   determining, for each selected risk factor, a risk factor loading coefficient for each security in the set by, at the least, performing a time series regression to obtain the sensitivity of each security's return to variations in the risk factor's return;
   projecting the risk factor covariance matrix into a future forecast, thereby producing a future forecast of the risk factor covariance matrix, wherein the step of projecting the risk factor covariance matrix into a future forecast comprises utilizing information in implied volatility; and
   projecting the idiosyncratic variance matrix into a future forecast, thereby producing a future forecast of the idiosyncratic variance matrix, wherein
   the determined risk factor loading coefficients, the future forecast of the risk factor covariance matrix, and the future forecast of the idiosyncratic variance matrix can be used together to determine a forecast of the variance-covariance matrix for all securities in the selected set of securities.

2. The method of claim 1, wherein the step of projecting the risk factor covariance matrix into a future forecast comprises utilizing implied volatility in the Chicago Board of Options Exchange VIX option contract to capture market expectations of future volatility.

3. The method of claim 1, wherein the step of selecting the set of securities comprises the step of selecting securities from the group of substantially all relatively active securities in a selected market.

4. The method of claim 3, wherein the selected market is the U.S. market and the set of securities includes substantially all securities traded on the New York Security Exchange, the American Security Exchange, and the NASDAQ National Market.

5. The method of claim 1, where the step of selecting at least two risk factors comprises the step of selecting the following risk factors: market, industry, sector, size and growth.

6. The method of claim 1, where the step of selecting at least two risk factors comprises the step of selecting the following risk factors: market, industry, size and U.S. market.

7. The method of claim 1, wherein the step of determining a risk factor loading for each security in the set comprises performing a time series regression to obtain the sensitivity of each securities' return to variations in the risk factor's return.

8. The method of claim 1, wherein the step of determining the factor loadings for the securities in the selected set of securities comprises the step of estimating the equation:

$$r_{it} = \alpha_i + \sum_{k=1}^{K} f_{kt}\beta_{ik} + \varepsilon_{it}, .$$

9. The method of claim 1, wherein the step of determining the risk factor loading coefficients comprises the step of adjusting risk factor loading estimates using a predetermined adjustment process to reduce estimation error.

10. The method of claim 1, further comprising the step of determining the forecast of the variance-covariance matrix for all securities in the selected set of securities.

11. A system, comprising:
    determining means for determining risk factor return for each risk factor in a set of selected risk factors;
    first estimating means for estimating a risk factor covariance matrix of the selected risk factors;
    second estimating means for estimating an idiosyncratic variance matrix corresponding to a set of selected securities;
    third estimating means for estimating, for each risk factor in the set of selected risk factors, a risk factor loading coefficient for each security in a set of selected securities;
    first projecting means for projecting the risk factor covariance matrix into a future forecast, thereby producing a future forecast of the risk factor covariance matrix, wherein the first projecting means utilizes information in implied volatility in projecting the risk factor covariance matrix into a future forecast; and
    second projecting means for projecting the idiosyncratic variance matrix into a future forecast, thereby producing a future forecast of the idiosyncratic variance matrix, wherein
    the estimated risk factor loading coefficients, the future forecast of the risk factor covariance matrix, and the future forecast of the idiosyncratic variance matrix can be used together to determine a forecast of the variance-covariance matrix for all securities in the selected set of securities.

12. The system of claim 11, wherein the first projecting means utilizes implied volatility in the Chicago Board of Options Exchange VIX option contract in projecting the risk factor covariance matrix into a future forecast, thereby capturing market expectations of future volatility.

13. The system of claim 11, wherein the set of selected securities is selected from the group of substantially all relatively active securities in a selected market.

14. The system of claim 13, wherein the selected market is the U.S. market and the set of securities includes substantially all securities traded on the New York Security Exchange, the American Security Exchange, and the NASDAQ National Market.

15. The system of claim 11, wherein the set of selected risk factors comprises the following risk factors: market, industry, sector, size and growth.

16. The system of claim 11, wherein the set of selected risk factors comprises the following risk factors: market, industry, size and U.S. market.

17. The method of claim 11, wherein the third estimating means estimates a risk factor loading for a selected risk factor and a security in the set of selected securities by, at the least, performing a time series regression to obtain the sensitivity of the security's return to variations in the selected risk factor's return.

18. The system of claim 16, wherein the third estimating means estimates a risk factor loading for a security in the set of selected securities by, at the least, estimating the equation:

$$r_{it} = \alpha_i + \sum_{k=1}^{K} f_{kt}\beta_{ik} + \varepsilon_{it},.$$

19. The system of claim 11, further comprising risk factor loading adjusting means for adjusting the risk factor loading estimates using a predetermined adjustment process to reduce estimation error.

20. The system of claim 11, further comprising determining means for determining the forecast of the variance-covariance matrix for all securities in the selected set of securities using the estimated risk factor loading coefficients, the future forecast of the risk factor covariance matrix, and the future forecast of the idiosyncratic variance matrix.

21. A computer program product including a machine readable medium having stored therein instructions, the instructions comprising:
instructions for determining a risk factor's return, wherein the risk factor is from a set of two or more selected risk factors;
instruction for constructing a risk factor covariance matrix corresponding to the selected risk factors;
instruction for constructing an idiosyncratic variance matrix corresponding to securities in a selected set of securities;
instructions for determining, for each risk factor in the set of risk factors, a risk factor loading coefficient for each security in the set of securities;
instructions for projecting the risk factor covariance matrix into a future forecast, thereby producing a future forecast of the risk factor covariance matrix, wherein the instructions for projecting the risk factor covariance matrix into a future forecast comprise instructions for utilizing information in implied volatility in projecting the risk factor covariance matrix into a future forecast; and
instructions for projecting the idiosyncratic variance matrix into a future forecast, thereby producing a future forecast of the idiosyncratic variance matrix, wherein the determined risk factor loading coefficients, the future forecast of the risk factor covariance matrix, and the future forecast of the idiosyncratic variance matrix can be used together to determine a forecast of the variance-covariance matrix for all securities in the selected set of securities.

22. The computer program product of claim 21, wherein the instructions for utilizing information in implied volatility comprise instructions for utilizing implied volatility in the Chicago Board of Options Exchange VIX option contract in projecting the risk factor covariance matrix into a future forecast to capture market expectations of future volatility.

23. The computer program product of claim 21, wherein the selected set of securities includes securities selected from the group of substantially all relatively active securities in a selected market.

24. The computer program product of claim 23, wherein the selected market is the U.S. market and the set of securities includes substantially all securities traded on the New York Security Exchange, the American Security Exchange, and the NASDAQ National Market.

25. The computer program product of claim 24, wherein the set of risk factors comprises the following risk factors: market, industry, sector, size and growth.

26. The computer program product of claim 21, wherein the set of risk factors comprises the following risk factors: market, industry, size and U.S. market.

27. The computer program product of claim 21, wherein the instructions for determining the risk factor loading coefficient for a security and a risk factor comprise instructions for performing a time series regression to obtain the sensitivity of the security's return to variations in the risk factor's return.

28. The computer program product of claim 27, wherein the instructions for estimating the factor loading coefficients comprise instructions for estimating the equation:

$$r_{it} = \alpha_i + \sum_{k=1}^{K} f_{kt}\beta_{ik} + \varepsilon_{it},.$$

29. The computer program product of claim 21, wherein the instructions for determining the risk factor loading coefficients comprise instructions for adjusting estimated risk factor loading coefficients using a predetermined adjustment process to reduce estimation error.

30. The computer program product of claim 21, further comprising instructions for determining the forecast of the variance-covariance matrix for all securities in the selected set of securities.

31. The method of claim 1, wherein the step of projecting the risk factor covariance matrix into a future forecast comprises utilizing information in implied volatility.

32. The system of claim 11, wherein the first projecting means utilizes information in implied volatility in projecting the risk factor covariance matrix into a future forecast.

33. The computer program product of claim 21, wherein the instructions for projecting the risk factor covariance matrix into a future forecast comprise instructions for utilizing information in implied volatility in projecting the risk factor covariance matrix into a future forecast.

* * * * *